United States Patent [19]

Hetznecker et al.

[11] Patent Number: 4,574,617
[45] Date of Patent: Mar. 11, 1986

[54] FLOATING RESTRICTION STANDARDS SYSTEM

[75] Inventors: Frank W. Hetznecker, Buffalo Grove; Frank P. Serritella, Wauconda, both of Ill.

[73] Assignee: Honeywell Inc., Minneapolis, Minn.

[21] Appl. No.: 179,573

[22] Filed: Aug. 21, 1980

[51] Int. Cl.$^4$ ............................................. G01B 13/10
[52] U.S. Cl. ............................................................. 73/37.9
[58] Field of Search .................... 73/37.5, 37.8, 37.9, 73/4 R

[56] References Cited

U.S. PATENT DOCUMENTS

| | | |
|---|---|---|
| 2,858,693 | 11/1958 | Entwistle . |
| 2,862,178 | 11/1958 | Moore . |
| 2,995,921 | 8/1961 | Emmons, III ........................ 73/37.8 |
| 3,349,605 | 10/1967 | Minix ..................................... 73/37.9 |
| 3,443,417 | 5/1969 | Meyer, Jr. ............................ 73/37.9 |
| 3,665,753 | 5/1972 | Walker .................................. 73/37.9 |
| 3,670,560 | 6/1972 | Dega ..................................... 73/37.9 |
| 4,088,009 | 5/1978 | Fukuda ............................. 73/37.8 X |
| 4,125,011 | 11/1978 | Porter .................................... 73/4 R |
| 4,187,715 | 2/1980 | Nevitt .................................. 73/37.9 |

FOREIGN PATENT DOCUMENTS

| | | | |
|---|---|---|---|
| 2534163 | 2/1977 | Fed. Rep. of Germany ....... 73/37.5 |
| 937054 | 9/1963 | United Kingdom ................. 73/37.9 |
| 156688 | 10/1962 | U.S.S.R. .............................. 73/37.5 |
| 305352 | 7/1971 | U.S.S.R. .............................. 73/37.9 |

Primary Examiner—Stewart J. Levy
Assistant Examiner—Joseph W. Roskos
Attorney, Agent, or Firm—Trevor B. Joike

[57] ABSTRACT

A pneumatic gaging system for determining the size of test restrictions is disclosed including a maximum restriction standard connected through an indicator to a source of pneumatic pressure, a minimum restriction standard connected through the indicator to the source of pneumatic pressure, a test restriction terminal for connecting the test restriction under test to the source of pneumatic pressure through the indicator and a valving system for alternately connecting the maximum restriction standard, the minimum restriction standard and the test restriction to the indicator for indicating the flow rates through the maximum and minimum restriction standards and the test restriction.

20 Claims, 2 Drawing Figures

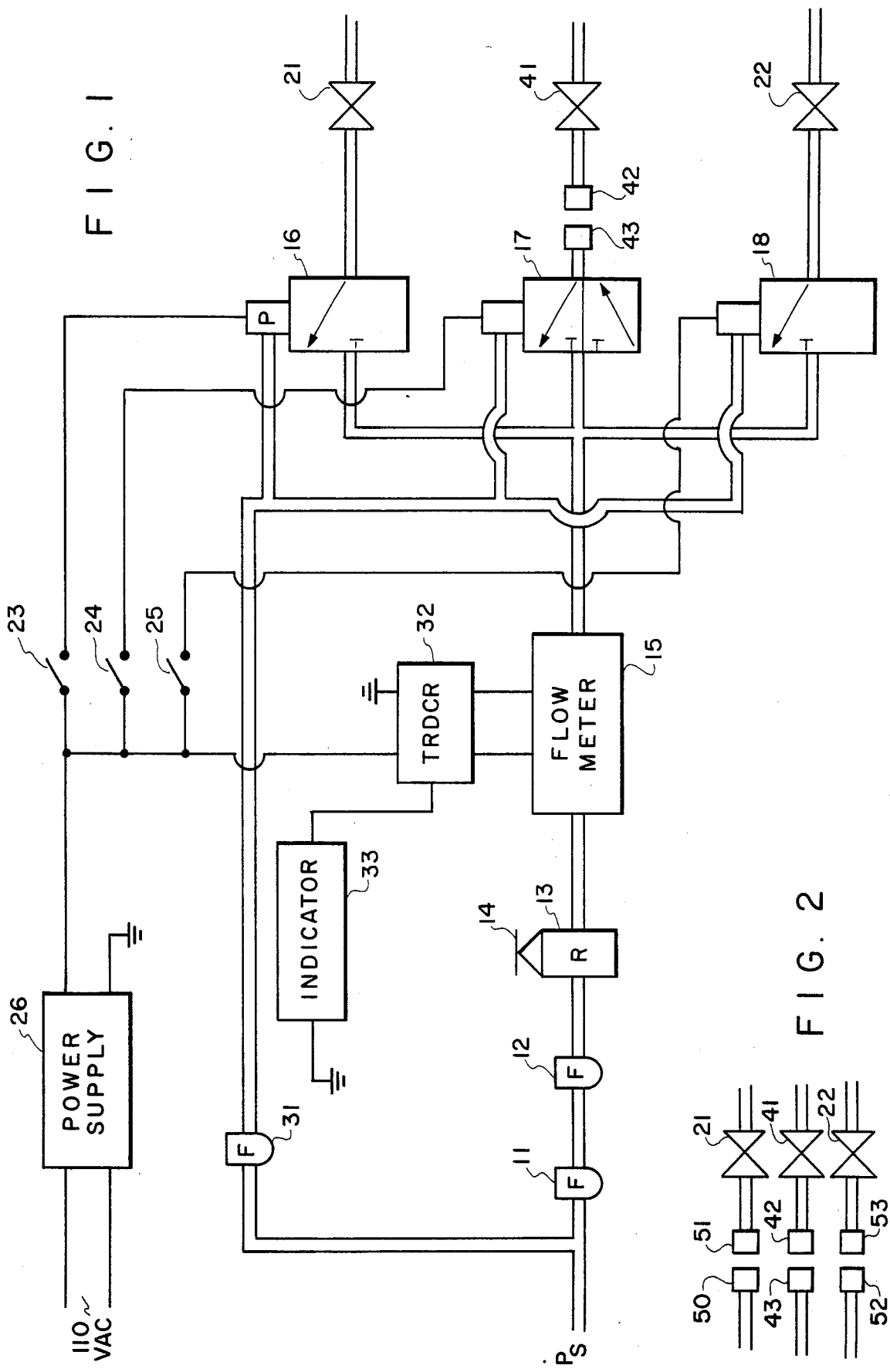

FLOATING RESTRICTION STANDARDS SYSTEM

BACKGROUND OF THE INVENTION

This invention relates to a test apparatus for testing the size of restrictions for air or gas flow and, more particularly, to such a test apparatus which ignore non-linearities caused by system and variable atmospheric conditions.

Prior art test apparatus, which are used for testing the size of restrictions, tend to be non-linear and dependent upon such variable conditions as temperature, pressure and circuit non-linearities. Even when the manufacturer of the test equipment states that its equipment is linear, the system really is not because the test apparatus has not been designed to ignore such non-linearities. Other test apparatus requires the use of rather bulky ring standards which, in cooperation with a probe connected to the test apparatus, are used for calibrating the test apparatus. Not only is the test apparatus bulky but these systems are limited because of the use of a probe. The test apparatus according to the instant invention is designed to be simple in construction and ignore non-linearities of the test apparatus and drifting of the output signals due to such variable atmospheric conditions as temperature and pressure.

SUMMARY OF THE INVENTION

Accordingly, the gaging system of the present invention incorporates an indicator, which may be in the form of a flow meter, for connecting a source of pneumatic pressure through a valving system to a maximum restriction standard, to a minimum restriction standard and to a restriction test terminal to which a restriction under test may be connected. The valving system alternately allows flow through the restriction standards and the test restriction so that the size of the test restriction can be computed as a function of the flow through the maximum and minimum restriction standards.

BRIEF DESCRIPTION OF THE DRAWING

These and other features and advantages will become more apparent from a detailed consideration of the invention when taken in conjunction with the drawings in which:

FIG. 1 shows the gaging system according to the present invention; and,

FIG. 2 shows terminal connectors for the maximum and minimum standards shown in FIG. 1.

DETAILED DESCRIPTION

In the drawing, a source of supply pressure $P_s$ is connected through first filter 11, which may for example be a 5 micron filter, and through second filter 12, which may be a 0.1 micron filter, to pressure regulating valve 13 (which may be a Fairchild Model 30) having manual adjustment 14 for determining its output pressure. For example, manual adjustment 14 may be adjusted to provide an output pressure from pressure regulating valve 13 of 15 psi. The output pressure from pressure regulating valve 13 is connected to flow meter 15 (which may be a Vol-O-Flo Model 10-10) for measuring the flow through the various restrictions to be described hereinafter. The output of the flow meter is connected to the input of valves 16, 17 and 18. Valves 16, 17 and 18 may be pilot assisted valves manufactured by Humphrey, Model No. 250AE1-3-10-21. The output of valve 16 is connected through the maximum restriction standard 21 to a reference pressure such as atmosphere. The output of valve 17 is connected to a terminal 43 for connection to the test restriction. The output of valve 18 is connected through minimum restriction standard 22 to a reference pressure such as atmosphere.

Valve 16 is opened by switch 23, valve 17 is opened by switch 24 and valve 18 is opened by switch 25. Each of these switches receives power from power supply 26 (which may be an Ecconomate EMA-24A) connected to a source of alternating current.

Transducer 32 is connected to flow meter 15 for converting the flow through flow meter 15 to a voltage which is then connected to indicator 33. Indicator 33 may be a digital volt meter for giving a visual display of the voltage from transmitter 32 or it may be a microprocessor for computing the size of the restriction under test which can then give a visual display of the size of the test restriction. Transducer 32 may be a Setra System No. 239E.

When restriction 41 is to be tested for its size, its connector 42 is connected to connector 43. Switch 23 is then operated for opening valve 16 and allowing pneumatic pressure to flow through the maximum restriction standard 21 the size of which is known. The voltage for maximum restriction standard 21 is read on indicator 33 and then switch 23 closes off valve 16. Switch 24 is then operated to open valve 17 and the voltage representing the flow through the restriction 41 under test is then read. However, the size of this restriction is unknown and is to be computed. Switch 24 then closes off valve 17. Finally, switch 25 is operated to open valve 18. The voltage representing the flow through minimum restriction standard 22, the size of which is known, is read. Switch 25 is then operated to close valve 18. Restrictions 21 and 22 are standard restrictions and their sizes are known. Also, the voltages representing the flow through restrictions 21, 22 and 41 are known. Knowing these quantities, the size of restriction 41 can be computed.

For example, the ratio of the voltage representing the flow through these three restrictions and the air flow size of these three restrictions can be given by the equation:

$$\frac{V_{Test} - V_{Min}}{R_{Test} - R_{Min}} = \frac{V_{Max} - V_{Test}}{R_{Max} - R_{Test}} \quad (1)$$

where $V_{Test}$ is the known voltage representing the flow through the test restriction, $R_{Test}$ is the unknown air flow size of the test restriction, $V_{Max}$ is the known voltage representing the flow through the maximum restriction standard, $R_{Max}$ is the known size of the maximum restriction standard, $V_{Min}$ is the known voltage representing the pneumatic flow through the minimum restriction standard, and $R_{Min}$ represents the known size of the minimum restriction standard. For convenience, equation (1) can be rewritten in the following form:

$$R_{Test} = \frac{R_{Min}[V_{Max} - V_{Test}] + R_{Max}[V_{Test} - V_{Min}]}{[V_{Max} - V_{Min}]} \quad (2)$$

Alternatively, the voltages and restriction sizes for the maximum and minimum restriction standards 21 and 22 can be used to develop an equation representing a straight line plot between the two known points. Thus, a straight line equation between two points can be given by the general expression:

$$y = Kx + C \quad (3)$$

where K is the slope of the plot and C is the offset value on the x coordinate when y is 0. Since two points on the line are known, the values for K and C can be determined. Then, since the voltage representing the pneumatic flow through test restriction 41 is known, the size can be determined from the equation.

Any non-linearities due to system performance or due to atmospheric conditions which act upon test restriction 41 may be ignored because the same non-linearities act upon standard restrictions 21 and 22. The system, therefore, provides a substantially accurate indication of the size of the restriction 41 under test.

As shown in FIG. 2, connectors 50–51 and 52–53 may be provided for the corresponding standards 21 and 22 to facilitate changing the sizes of these restrictions so that the range within which test restrictions 41 are sorted may be altered.

The embodiments of the invention in which an exclusive property or right is claimed are defined as follows:

1. A pneumatic gaging system for determining the relative size of restrictions comprising:
   sensing means for receiving pressure from a source of pneumatic pressure and for sensing flow rates;
   maximum restriction standard means for establishing a maximum flow rate through said sensing means;
   minimum restriction standard means for establishing a minimum flow rate through said sensing means;
   test restriction terminal means for receiving a restriction under test so that a test flow rate can be established through said sensing means; and,
   valving means for alternately connecting said maximum restriction standard means, said minimum restriction standard means and said test restriction terminal means to said sensing means, whereby said sensing means senses said maximum flow rate, said minimum flow rate and said test flow rate so that it can be determined if said test flow rate falls between said maximum and minimum flow rates.

2. The system of claim 1 wherein said valving means comprises first valve means for connecting said maximum restriction standard means to said sensing means, second valve means for connecting said minimum restriction standard means to said sensing means, and third valve means for connecting said test restriction terminal means to said sensing means.

3. The system of claim 2 wherein said maximum restriction standard means is connected on one side to said first valve means and on a second side to a first reference pressure, and said minimum restriction standard means is connected on one side to said second valve means and on a second side to a second reference pressure.

4. The system of claim 3 wherein said first and second reference pressures are atmosphere.

5. The system of claim 4 wherein said sensing means comprises a transducer for converting said flow rates to corresponding voltages.

6. The system of claim 5 wherein said sensing means further comprises an indicating means for displaying said voltages.

7. The system of claim 1 wherein said maximum restriction standard means is connected on one side to said valving means and on a second side to a first reference pressure, and said minimum restriction standard means is connected on one side to said valving means and on a second side to a second reference pressure.

8. The system of claim 7 wherein said first and second reference pressures are atmosphere.

9. The system of claim 8 wherein said sensing means comprises a transducer for converting said flow rates to corresponding voltages.

10. The system of claim 9 wherein said sensing means further comprises an indicating means for displaying said voltages.

11. The system of claim 1 wherein said sensing means comprises a transducer for converting said flow rates to corresponding voltages.

12. The system of claim 11 wherein said sensing means further comprises an indicating means for displaying said voltages.

13. The system of claim 1 wherein said maximum and minimum restriction standard means are connected to a reference pressure.

14. The system of claim 13 wherein said reference pressure is atmosphere.

15. A gaging system for determining the relative size of restrictions comprising:
   sensing means for receiving pressure from a source of pressure and for sensing flow rates;
   maximum restriction terminal means for receiving a maximum restriction standard so that a maximum flow rate can be established through said sensing means;
   minimum restriction terminal means for receiving a minimum restriction standard so that a minimum flow rate can be established through said sensing means;
   test restriction terminal means for receiving a restriction under test so that a test flow rate can be established through said sensing means; and,
   valving means for alternately connecting said maximum restriction terminal means, said minimum restriction terminal means and said test restriction terminal means to said sensing means, whereby said sensing means senses said maximum, minimum and test flow rates so that it can be determined if said test flow rate falls between said maximum and minimum flow rates.

16. The system of claim 15 wherein said valving means comprises first valve means for connecting said maximum restriction terminal means to said sensing means, second valve means for connecting said minimum restriction terminal means to said sensing means, and third valve means for connecting said test restriction terminal means to said sensing means.

17. The system of claim 16 wherein said sensing means comprises a transducer for converting said flow rates to corresponding voltages.

18. The system of claim 17 wherein said sensing means further comprises an indicating means for displaying said voltages.

19. The system of claim 15 wherein said sensing means comprises a transducer for converting said flow rates to corresponding voltages.

20. The system of claim 19 wherein said sensing means further comprises an indicating means for displaying said voltages.

* * * * *